United States Patent
Choi et al.

(10) Patent No.: US 11,502,870 B2
(45) Date of Patent: Nov. 15, 2022

(54) METHOD FOR MANAGING ACCESS CONTROL LIST BASED ON AUTOMOTIVE ETHERNET AND APPARATUS USING THE SAME

(71) Applicant: ELECTRONICS AND TELECOMMUNICATIONS RESEARCH INSTITUTE, Daejeon (KR)

(72) Inventors: Joong-Yong Choi, Sejong-si (KR); Dong-Wook Kang, Daejeon (KR); Dae-Won Kim, Daejeon (KR); Sang-Woo Lee, Daejeon (KR); Jin-Yong Lee, Daejeon (KR); Boo-Sun Jeon, Daejeon (KR); Bo-Heung Chung, Daejeon (KR); Hong-Il Ju, Daejeon (KR); Byeong-Cheol Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 96 days.

(21) Appl. No.: 17/077,702

(22) Filed: Oct. 22, 2020

(65) Prior Publication Data

US 2021/0184885 A1 Jun. 17, 2021

(30) Foreign Application Priority Data

Dec. 11, 2019 (KR) .................. 10-2019-0165064

(51) Int. Cl.
*H04L 12/28* (2006.01)
*H04L 12/40* (2006.01)
*H04L 67/12* (2022.01)

(52) U.S. Cl.
CPC .... *H04L 12/2856* (2013.01); *H04L 12/40006* (2013.01); *H04L 12/40169* (2013.01);
(Continued)

(58) Field of Classification Search
CPC .......... H04L 12/2856; H04L 12/40006; H04L 12/40169; H04L 67/12; H04L 2012/40215; H04L 2012/40273
See application file for complete search history.

(56) References Cited

U.S. PATENT DOCUMENTS 9,769,114 B2 9/2017 Chae et al.
2010/0098048 A1 4/2010 Kang et al.
(Continued)

FOREIGN PATENT DOCUMENTS

| KR | 10-1630729 | 6/2016 |
|---|---|---|
| KR | 10-1740957 | 5/2017 |
| KR | 10-1976717 | 8/2019 |

OTHER PUBLICATIONS

Feng Luo et al., "Security Mechanisms Design of Automotive Gateway Firewall", SAE Technical Paper, Apr. 2, 2019, pp. 1-8.

*Primary Examiner* — Chandrahas B Patel
(74) *Attorney, Agent, or Firm* — Kile Park Reed & Houtteman PLLC (57) ABSTRACT

Disclosed herein are a method for managing an access control list based on an automotive Ethernet and an apparatus for the same. The method includes analyzing a new access control rule that is input to a vehicle in which the automotive Ethernet is applied, searching for any one target unit to manage the new access control rule in consideration of at least one of a destination and an application target corresponding to the new access control rule, and storing the (Continued)

new access control rule by transmitting a storage request message corresponding to the new access control rule to the target unit.

16 Claims, 10 Drawing Sheets

(52) U.S. Cl.
CPC .... *H04L 67/12* (2013.01); *H04L 2012/40215* (2013.01); *H04L 2012/40273* (2013.01)

(56) References Cited

U.S. PATENT DOCUMENTS

| | | |
|---|---|---|
| 2019/0141047 A1 | 5/2019 | Lee et al. |
| 2021/0160315 A1* | 5/2021 | Linn-Moran ........... H04L 12/40 |
| 2021/0173634 A1* | 6/2021 | Nakahara .............. G06F 3/0604 |
| 2021/0185095 A1* | 6/2021 | Harel ..................... H04L 63/20 |

* cited by examiner

| PROTOCOL TYPE | SOURCE IP | SOURCE PORT | DESTINATION IP | DESTINATION PORT |
|---|---|---|---|---|
| TCP | 192.172.1.10 | 5008 | 192.168.10.30 | 5010 |

(810 indicates DESTINATION IP column)

FIG. 9

| PROTOCOL TYPE | SOURCE IP | SOURCE PORT | DESTINATION IP | DESTINATION PORT | NETWORK DEVICE IF | CAN ID |
|---|---|---|---|---|---|---|
| TCP | 192.172.5.10 | 5008 | 192.168.1.30 | 5010 | P-CAN | 0x00C1 \| 0x00D5 |

(910 indicates CAN ID column)

FIG. 10

| NO. | PROTOCOL TYPE | SOURCE IP | SOURCE PORT | DESTINATION IP | DESTINATION PORT | NETWORK DEVICE IF | CAN ID |
|---|---|---|---|---|---|---|---|
| 1 | UDP | * | 5010 | * | 5011 | * | * |
| 2 | TCP | 192.168.0.10 | 5008 | 192.168.0.11 | 5009 | * | * |
| 3 | UDP | 192.168.0.10 | 5008 | 192.168.0.12 | 5009 | * | * |
| 4 | CAN | * | * | * | * | P-CAN | 0x00C1 \| 0x00D5 |
| 5 | CAN | * | * | * | * | C-CAN | 0x00D1 \| 0x00D5 |

(1010, 1020, 1030, 1040, 1050, 1060, 1070, 1080 label columns NO., PROTOCOL TYPE, SOURCE IP, SOURCE PORT, DESTINATION IP, DESTINATION PORT, NETWORK DEVICE IF, CAN ID respectively)

METHOD FOR MANAGING ACCESS CONTROL LIST BASED ON AUTOMOTIVE ETHERNET AND APPARATUS USING THE SAME

CROSS REFERENCE TO RELATED APPLICATION

This application claims the benefit of Korean Patent Application No. 10-2019-0165064, filed Dec. 11, 2019, which is hereby incorporated by reference in its entirety into this application.

BACKGROUND OF THE INVENTION

1. Technical Field

The present invention relates generally to technology for managing an access control list based on an automotive Ethernet, and more particularly to technology for enabling application of many access control lists by managing access control rules so as to be distributed to a domain gateway or an electronic control unit (ECU) having better performance when it is intended to apply access control rules greater in number than the number of entries in an access control list capable of being stably managed by a vehicle gateway.

2. Description of the Related Art

Vehicles to be released in the future will be required to quickly and securely send and receive much more data than at present because various types of Advanced Driver Assistance Systems (ADAS) for receiving information from camera sensors and radar and processing the same are expected to be installed therein. Accordingly, automotive Ethernet technology is receiving a lot of attention these days. The speed of the automotive Ethernet is about 100 Mbps, which is much faster than that of a Control Area Network (CAN) (1 Mbps) or FlexRay (10 Mbps). With the adoption of automotive Ethernet technology, advantages such as increased bandwidth, lightweight network and reduction of cost therefor, scalability, compatibility, an open standard, standardization, and the like are acquired, but there is a disadvantage in that the existing security vulnerabilities of Ethernet remain.

Figure 1:
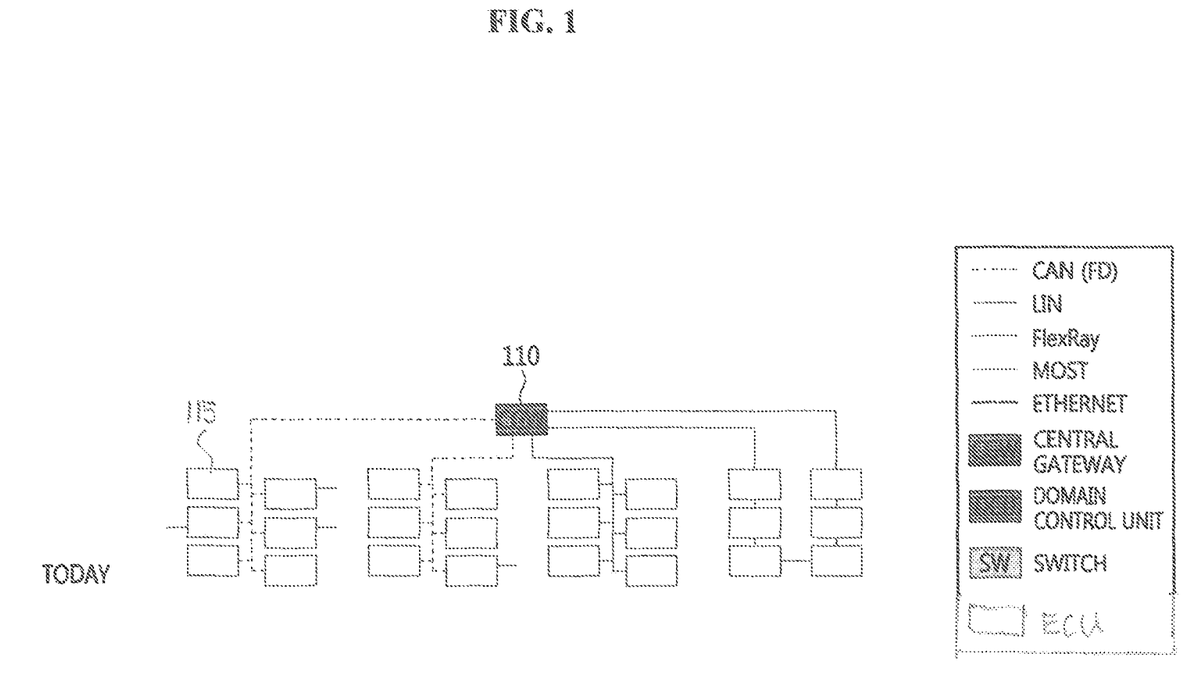
FIGS. 1 to 3 are views illustrating an example of trends of changes in in-vehicle network topology.
Figure 2:
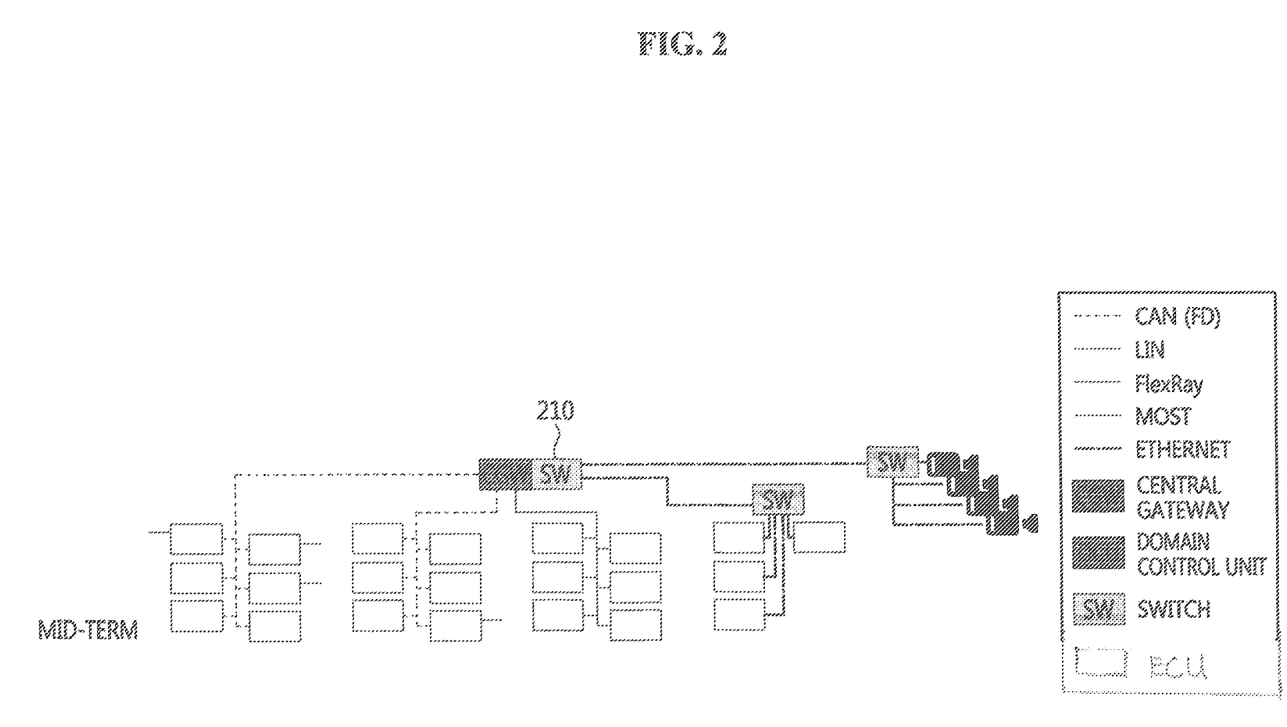
Figure 3:
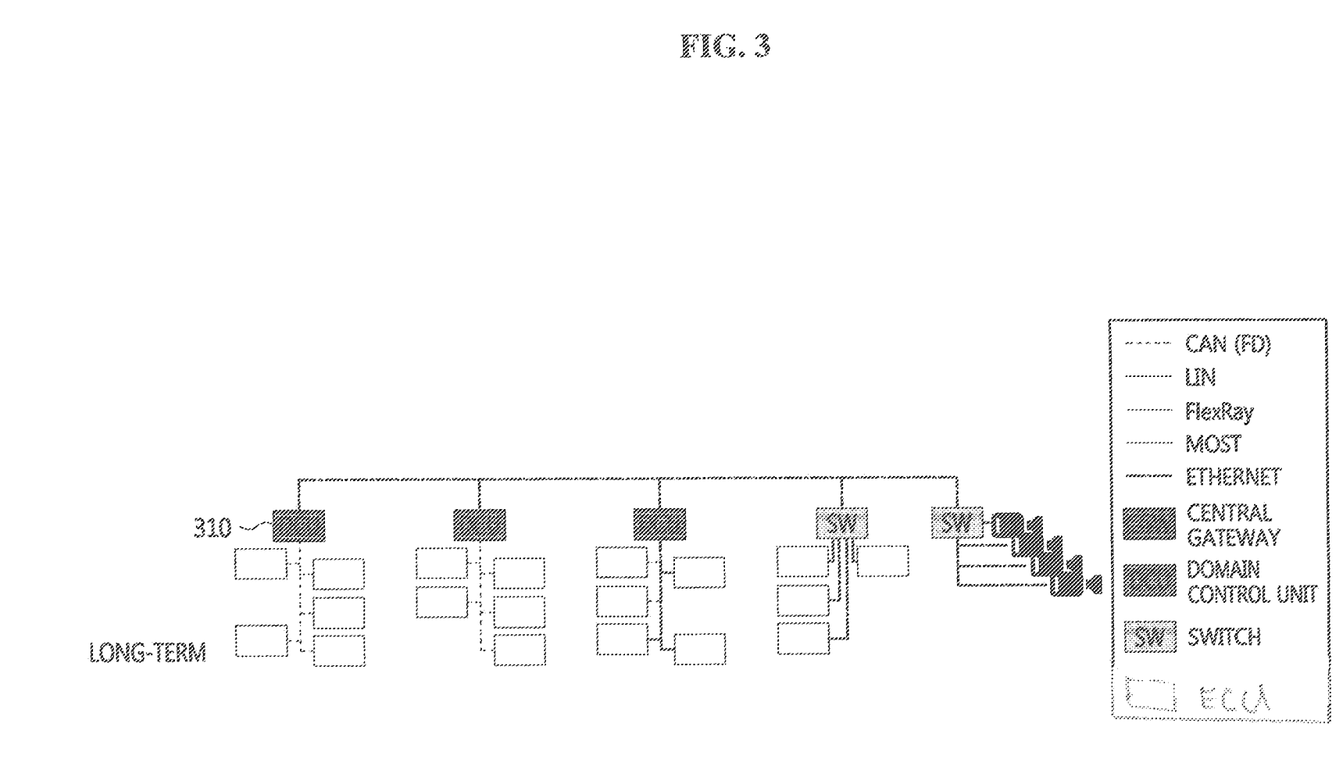

As described above, the automotive Ethernet will be gradually applied to upcoming vehicles, and a gateway device will be added in order to efficiently manage the automotive Ethernet along with existing networks, such as a Local Interconnect Network (LIN), a CAN with Flexible Data rate (CAN/FD), FlexRay, and the like. For example, some gateways are installed in existing vehicles, as shown in FIGS. 1 to 3, but beyond a simple message conversion function thereof, additional functions necessitated due to a change in the network (e.g., security functions and the like) are expected to be added to the gateways.

When it is intended to apply network security functions using a vehicle gateway, various methods are required, and such methods are practically applicable. However, due to the limited amount of resources and time constraints, a security module that is more lightweight than security methods applicable to general networks is required.

Among methods that are easily applicable for construction of a network firewall, there is a method of using an access control list (ACL) in order to pass only permitted messages and block unregistered messages, that is, unauthorized messages. Also, as a result of application of this method to automotive Ethernet, there are methods for setting an access control list for automotive Ethernet messages and determining whether to allow or block access by checking basic information and state information of the messages.

However, when automotive Ethernet messages are filtered out using an access control list, as the number of access control rules to be checked increases, the size of memory required in order to store the access control rules is also increased, which may be inefficient in terms of performance.

DOCUMENTS OF RELATED ART (Patent Document 1) Korean Patent No. 10-1630729, registered on Jun. 9, 2016 and titled "Method and system for providing Ethernet communication optimized for vehicle".

SUMMARY OF THE INVENTION

An object of the present invention is to provide technology for efficiently managing an access control list for protecting an in-vehicle network.

Another object of the present invention is to limit the number of access control lists intensively managed by a vehicle gateway and to store newly added access control policies in a distributed manner, thereby preventing a situation in which an attack message is not filtered out because a new access control policy is not added.

A further object of the present invention is to perform lightweight security for an in-vehicle network by using idle resources of an ECU in a vehicle to the greatest extent possible.

In order to accomplish the above objects, a method for managing an access control list based on an automotive Ethernet according to the present invention includes analyzing a new access control rule input to a vehicle in which the automotive Ethernet is applied; searching for any one target unit to manage the new access control rule in consideration of at least one of a destination and an application target corresponding to the new access control rule; and storing the new access control rule by transmitting a storage request message corresponding to the new access control rule to the target unit.

Here, searching for the target unit may be configured to look for a travel route for moving from the gateway of the vehicle to the destination corresponding to the new access control rule and to select any one of multiple control units located on the travel route as the target unit.

Here, searching for the target unit may be configured to select the target unit by giving priority to a control unit at an upper level, among the multiple control units, and when at least one of the memory usage, the average CPU usage and the network load of the control unit at the upper level is equal to or greater than a preset threshold, to select a control unit at a level immediately beneath the upper level as the target unit.

Here, searching for the target unit may be configured to select the target unit in consideration of the average and the standard deviation of Control Area Network (CAN) ID transmission periods corresponding to at least one control unit connected to a CAN bus, among the multiple control units, when a CAN ID is included in the application target corresponding to the new access control rule.

Here, searching for the target unit may be configured to select the target unit by further searching for a control unit other than a current control unit when it is determined based on variation in the average and the standard deviation that the CAN ID transmission period of the current control unit is delayed.

Here, a network in which the automotive Ethernet and a Control Area Network (CAN) are mixed may be applied to the vehicle.

Here, storing the new access control rule may include receiving, from the target unit, a storage confirmation message for checking whether storage of the new access control rule succeeds.

Here, when the new access control rule fails to be stored in the target unit, the storage confirmation message may include a result indicating storage failure and the cause of the failure.

Also, an apparatus for managing an access control list based on an automotive Ethernet according to an embodiment of the present invention includes a communication unit for receiving a new access control rule; and a processor for analyzing the new access control rule that is input to a vehicle in which the automotive Ethernet is applied, searching for any one target unit to manage the new access control rule in consideration of at least one of a destination and an application target corresponding to the new access control rule, and storing the new access control rule by transmitting a storage request message corresponding to the new access control rule to the target unit.

Here, the processor may look for a travel route for moving from the gateway of the vehicle to the destination corresponding to the new access control rule and select any one of multiple control units located on the travel route as the target unit.

Here, the processor may select the target unit by giving priority to a control unit at an upper level, among the multiple control units, and when at least one of the memory usage, the average CPU usage and the network load of the control unit at the upper level is equal to or greater than a preset threshold, the processor may select a control unit at a level immediately beneath the upper level as the target unit.

Here, the processor may select the target unit in consideration of the average and the standard deviation of Control Area Network (CAN) ID transmission periods corresponding to at least one control unit connected to a CAN bus, among the multiple control units, when a CAN ID is included in the application target corresponding to the new access control rule.

Here, when it is determined based on variation in the average and the standard deviation that the CAN ID transmission period of a current control unit is delayed, the processor may further search for a control unit other than the current control unit, thereby selecting the target unit.

Here, a network in which the automotive Ethernet and a Control Area Network (CAN) are mixed may be applied to the vehicle.

Here, the processor may receive, from the target unit, a storage confirmation message for checking whether storage of the new access control rule succeeds.

Here, when the new access control rule fails to be stored in the target unit, the storage confirmation message may include a result indicating storage failure and the cause of the failure.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIGS. 1 to 3 are views illustrating an example of trends of changes in in-vehicle network topology.

Referring to FIGS. 1 to 3, the communication network of a vehicle is configured such that multiple ECUs 115 are connected based on a central gateway CGW 110, and may include various types of subnetworks using a Control Area Network (CAN), a CAN with Flexible Data rate (CAN-FD), a Local Interconnect Network (LIN), FlexRay, Media-Oriented Systems Transport (MOST), the automotive Ethernet, and the like.

Most existing vehicles have their own single gateway or no gateway, and due to the cost thereof, it was only recently that gateways began to be applied. Meanwhile, the automotive Ethernet has begun to be applied to recently released or developed vehicles, and the range of application of the automotive Ethernet is increasing because sensors, which are added for a driving assistance system, such as an ADAS, or autonomous driving, require a large amount and variety of traffic information.

Referring to FIG. 1, when the automotive Ethernet is initially adopted, a legacy network, including a CAN(-FD), and an automotive Ethernet may be connected together with a single gateway 110.

It is expected that a domain control unit DCU 310, equivalent to a gateway 110, will soon be applied coupled to a switch SW 210 in each network domain, as shown in FIG. 2 and FIG. 3, and that the function of converting messages in each domain or between heterogenous networks and security functions will be included therein.

In order to apply security functions, which become more important according to the above-described change in the in-vehicle network configuration, an access control module may be applied, and a lightweight security module may be applied using an access control list based on a whitelist.

The present invention intends to describe the main operation flow through an internal network configured with a CAN and an automotive Ethernet (referred to as 'Ethernet' hereinbelow). However, this should not be understood as excluding other network protocols, such as a LIN, FlexRay, MOST, and the like, and is adopted for ease of description of the present invention by simplifying a network configuration.

Figure 4:
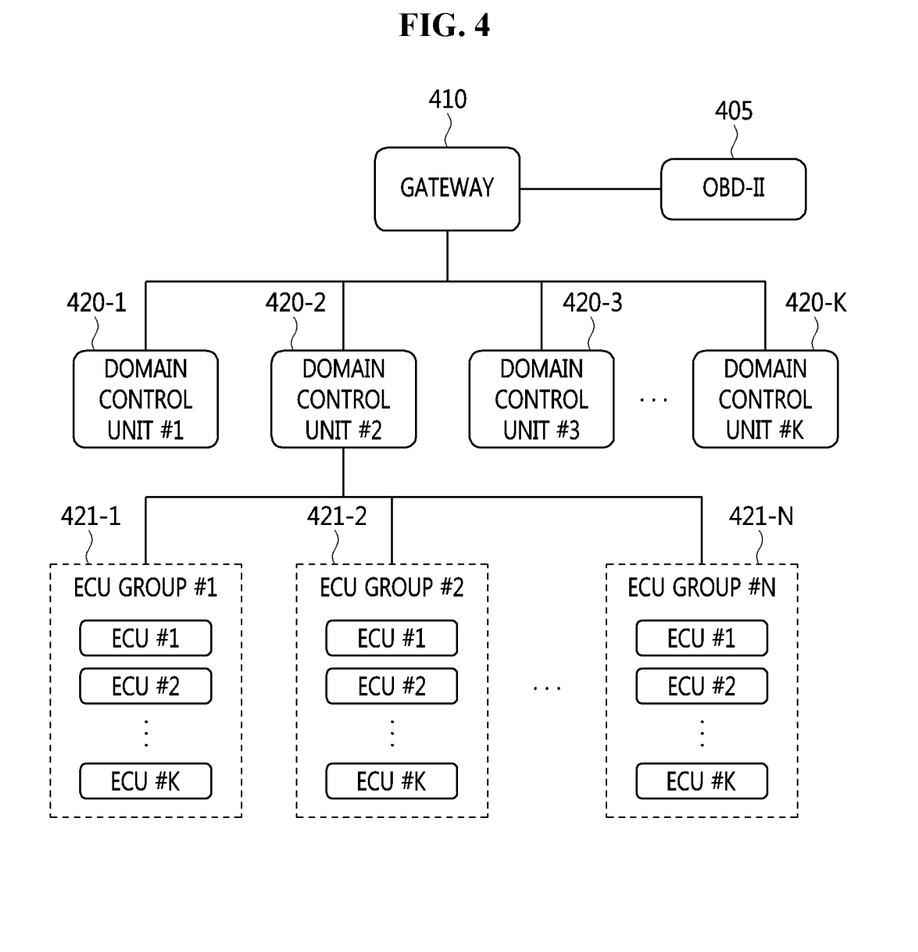
FIG. 4 is a view illustrating an example of an in-vehicle network hierarchy.

FIG. 4 is a view illustrating an example of an in-vehicle network hierarchy.

Referring to FIG. 4, the internal network of a vehicle may include a gateway 410, OBD-II 405, domain control units 420-1 to 420-$k$, ECU groups 421-1 to 421-$n$, and ECUs included in the respective groups.

Here, the gateway 410 may serve to deliver messages between the inside and the outside of the vehicle. Generally, when it is necessary to apply a security module, the security module is applied to the gateway 410, whereby malicious messages and malicious access may be blocked.

Here, the OBD-II 405 stands for an On-Board Diagnostic port, and may be a port for connecting a vehicle diagnostic device. That is, the OBD-II 405 is a diagnostic port for vehicle repair and maintenance, but may be used as a channel through which hackers monitor in-vehicle network messages and inject malicious messages.

Accordingly, the present invention proposes a method for adding a new access control rule to an access control list in order to prevent malicious access through the OBD-II 405.

Here, the domain control units 420-1 to 420-$k$ may be ECUs that are equivalent in function to the gateway 410, and various domains, such as a powertrain domain, a chassis domain, a body domain, an infotainment domain, and the like, may be present. Under the domain control units 420-1 to 420-$k$, sub-ECUs may or may not be present. That is, a single domain control unit may include one or more ECUs for transmitting information of respective sensors, or the domain control unit itself may operate as a single ECU.

Here, each of the ECU groups 421-1 to 421-$n$ may be a group of ECUs that are closely related to each other. The multiple ECUs included in the ECU groups 421-1 to 421-$n$ are entities that transmit and receive information by being connected with an engine, a transmission, and sensors. Generally, about 50~100 ECUs may be connected to a single subnetwork.

Figure 5:
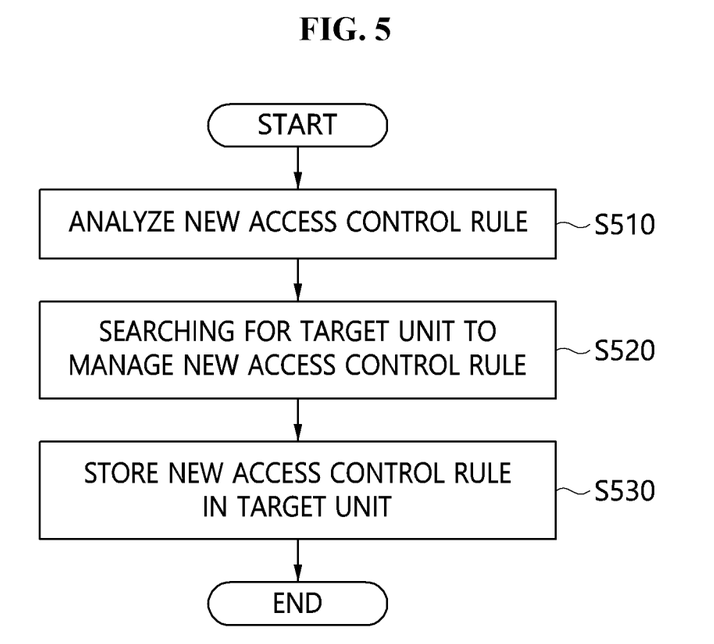
FIG. 5 is a flowchart illustrating a method for managing an access control list based on an automotive Ethernet according to an embodiment of the present invention.

FIG. 5 is a flowchart illustrating a method for managing an access control list based on an automotive Ethernet according to an embodiment of the present invention.

Referring to FIG. 5, in the method for managing an access control list based on an automotive Ethernet according to an embodiment of the present invention, a new access control rule that is input to a vehicle in which the automotive Ethernet is applied is analyzed at step S510.

Figure 6:
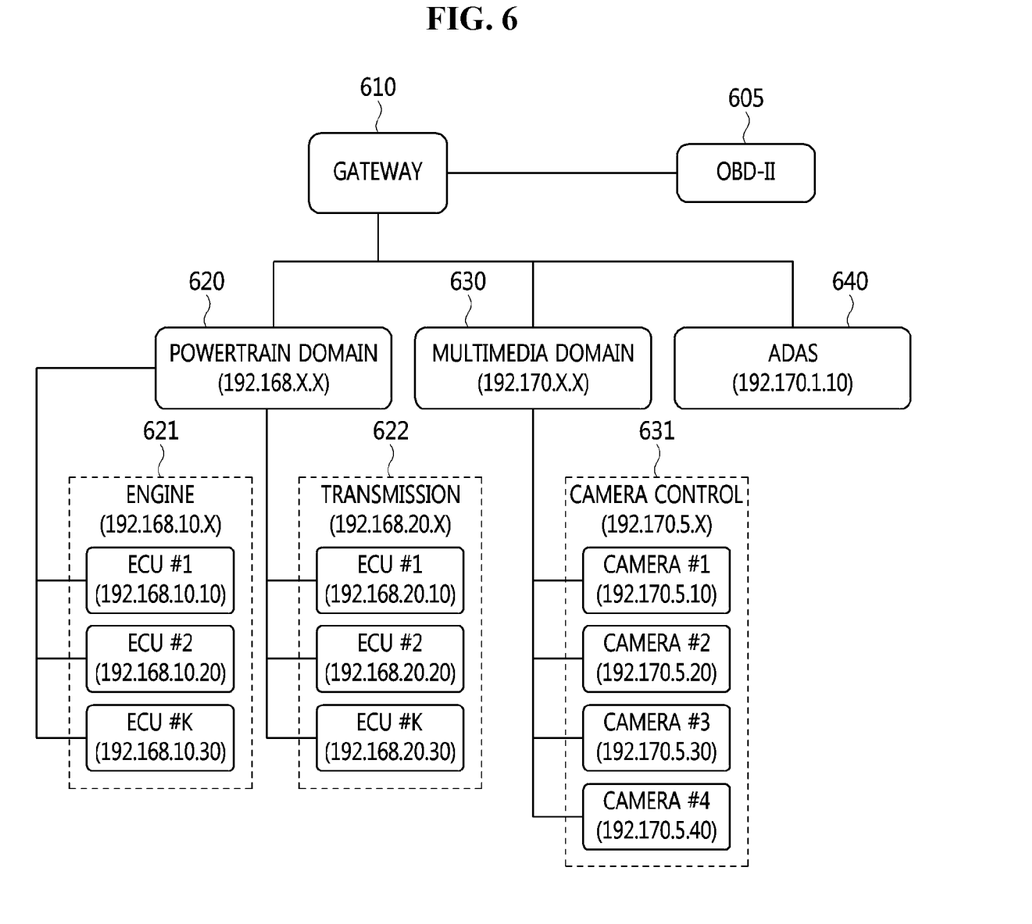
FIG. 6 is a view illustrating an example of an in-vehicle network based on Ethernet according to the present invention.

Here, an in-vehicle network according to an embodiment of the present invention may be an Ethernet-based network, as shown in FIG. 6.

For example, an ADAS 640, which is increasingly applied in recently released vehicles, may receive information of an engine 621 or a transmission 622 in order to acquire vehicle driving information for cruise control service, and may also receive information related to camera control 631 in order to detect deviation from a lane.

These kinds of information may be received through messages transmitted from individual ECUs included in the engine (621) group and the transmission (622) group included in a powertrain domain 620. For example, the ECU #3 of the engine (621) group may generate a message, the destination of which is the ADAS 640, thereby transmitting information about engine RPM or speed information thereto.

Also, camera information may be transmitted from the camera control (631) group of a multimedia domain 630 to the ADAS 640. For example, the Camera #1 ECU of the camera control (631) group may generate a message, the destination of which is the ADAS 640, and transmit the same to the ADAS 640.

Meanwhile, when the ADAS 640 determines that the vehicle deviates from a lane based on the determination of the driving situation, the ADAS 640 generates a message, the destination of which is the transmission 622, and transmits the same, thereby smoothly controlling the vehicle.

As described above, the message transmitted from each of the ECUs (including the ADAS) passes through the firewall of a gateway 610 and an access control module, and then only the allowed message is transmitted to the destination. Here, as the number of messages passing through the gateway 610 increases, the number of access control lists becomes more important. Also, because cost and stability are regarded as being more important in vehicles than in other systems, it is necessary to make the best use of resources of ECUs as well as a gateway.

Here, the gateway 610 has limited resources, and an increase in the number of access control lists further affects the processing rate. Therefore, limiting the number of access control lists to be used in the access control module of the gateway may be an important issue with regard to ensuring stability. However, when the number of access control lists is limited and when registration of a new access control rule is not allowed even though more access control rules are required, the flow of necessary messages may be restricted, or it may be difficult to apply a more precise rule.

Therefore, in order to overcome these limitations, the present invention intends to propose a method for analyzing a new access control rule that is input through the port of the OBD-II 605, searching for a control unit other than the gateway 610 to manage the new access control rule, and storing the new access control rule in the control unit.

Here, the new access control rule may be input through the OBD-II 605, but may also be input through other networks and devices connected with the gateway 610.

Here, a network in which the automotive Ethernet and a control area network (CAN) are mixed may be applied to the vehicle.

Figure 7:
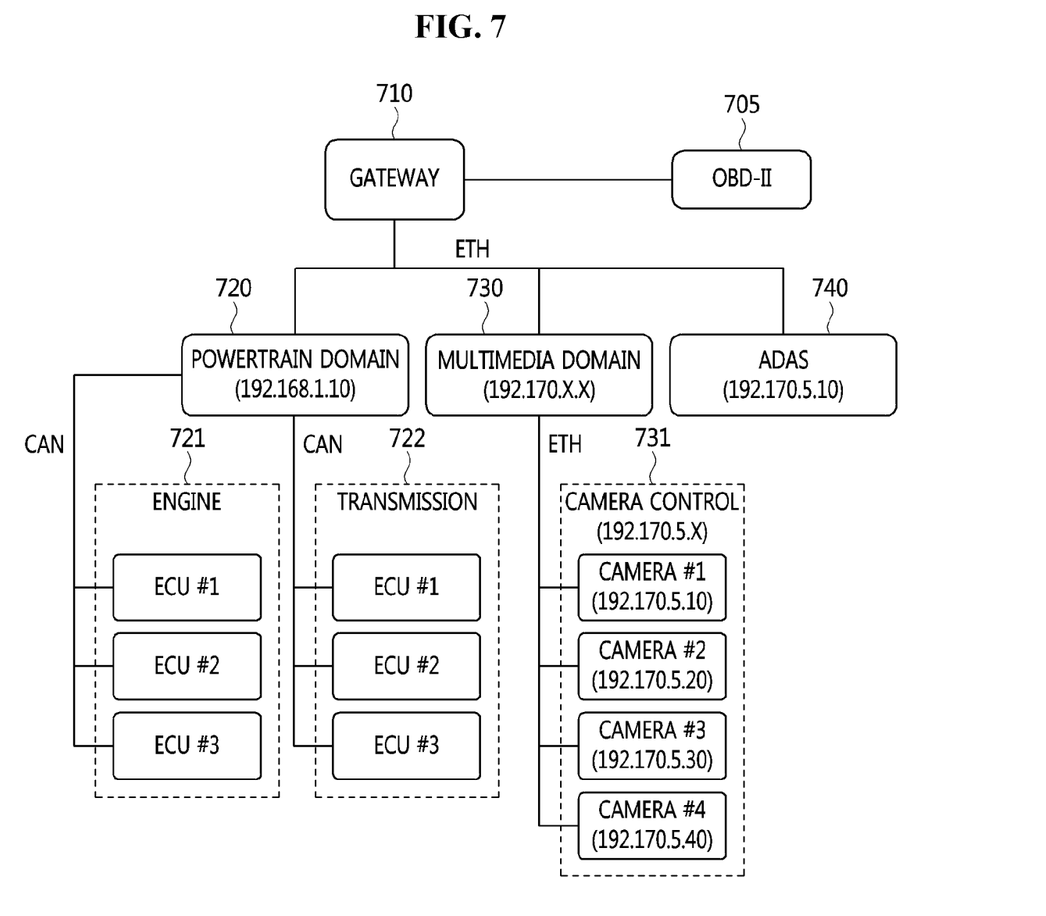
FIG. 7 is a view illustrating an example of an in-vehicle network in which a CAN and Ethernet are mixed according to the present invention.

For example, referring to FIG. 7, the internal network of the vehicle according to an embodiment of the present invention may correspond to a network environment in which a CAN and Ethernet are mixed. Here, when components in the powertrain domain 720 are connected via a CAN bus as shown in FIG. 7, a vehicle control message transmitted by the ADAS 740 is transmitted as an Ethernet message, but may be converted into a CAN message when it passes through the gateway 710 and the powertrain domain 720. That is, the message may be converted into a CAN message, and may then be transmitted to an ECU included in the engine 721 or the transmission 722.

Also, in the method for managing an access control list based on an automotive Ethernet according to an embodiment of the present invention, a target unit to manage the new access control rule is searched for at step S520 in consideration of at least one of a destination and an application target corresponding to the new access control rule.

Here, the target unit may be any one of the ECUs at the domain control unit level, which is equivalent in function to the gateway.

Here, a travel route for moving from the gateway of the vehicle to the destination corresponding to the new access control rule is looked for, and any one of multiple control units located on the travel route may be selected as the target unit.

Figure 8:
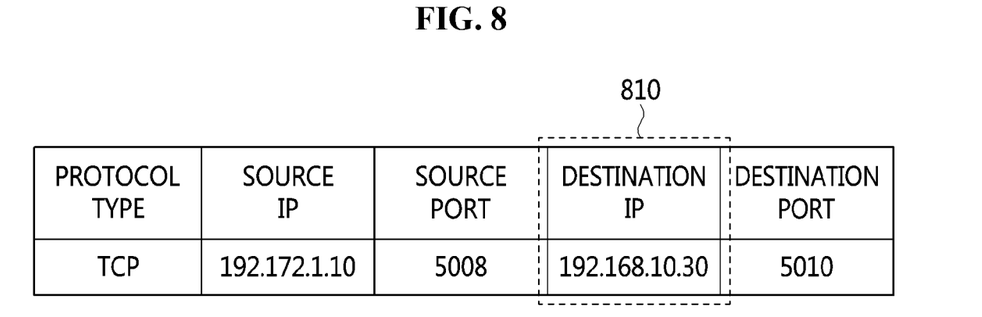
FIGS. 8 to 9 are views illustrating an example of an access control rule according to the present invention.

For example, when the new access control rule is as shown in FIG. 8, the travel route may be looked for by referring to 'destination IP' corresponding to the destination 810. Then, a DCU (or an ECU equivalent in function thereto) located on the travel route may be selected as the target unit for storing and managing the new access control rule. Here, in order to quickly look for the travel route to the destination 810, the IP address system is required to be well organized with regard to respective levels of ECUs, and to this end, reference may be made to the configuration of the in-vehicle network illustrated in FIG. 6 and FIG. 7.

If the destination IP address is 192.168.10.30, as shown in FIG. 8, the new access control rule may be transmitted to the DCU corresponding to 192.168.X.X, in which case the actual address of the DCU may be set to match the IP address system (e.g., 192.168.1.10).

Here, the target unit is selected by prioritizing a control unit at an upper level, among multiple control units. However, when at least one of the memory usage, the average CPU usage, and the network load of the control unit at the upper level is equal to or greater than a preset threshold, a control unit at the level immediately beneath the upper level may be selected as the target unit.

Generally, when the network environment of a vehicle is constructed, the amount of network traffic for transmission/reception messages is calculated in advance along with the CPU usage and the memory usage, and the size of an access control list capable of being managed by each of the ECUs (including a domain gateway) may be identified based on the calculated values. However, the load on each ECU may be changed due to messages and access control rules that are newly added during use of the system for a long time, or due to various external factors, such as deterioration of the device.

Accordingly, in the present invention, the target unit to store and manage a new access control rule may be selected in consideration of the CPU usage, memory usage, and network load of each of the multiple control units. For example, even though unoccupied (available) entries are present in the access control list in an ECU in which a new access control rule is to be stored, if the average CPU usage of the corresponding ECU is equal to or greater than a specific threshold, the new access control rule may be stored in an ECU at the level beneath that of the corresponding ECU.

Here, when the application target corresponding to the new access control rule includes a control area network (CAN) ID, the target unit may be selected in consideration of the average and standard deviation of CAN ID transmission periods, corresponding to at least one control unit connected through a CAN bus, among the multiple control units.

Figure 9:
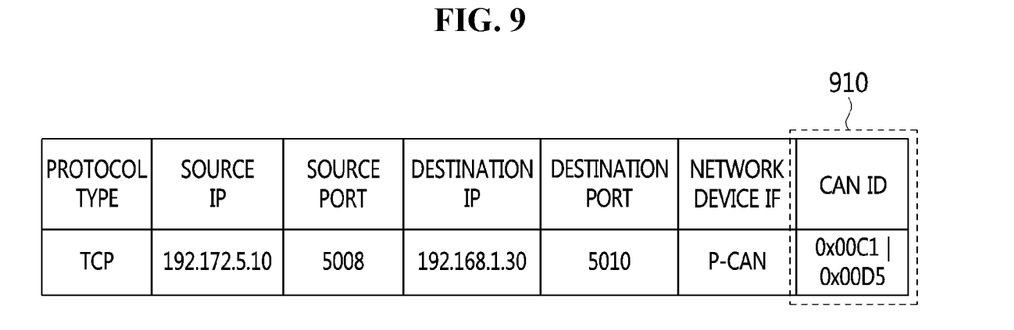

That is, the target unit may be primarily selected by searching for the target unit based on the 'destination IP' of the new access control rule. When the access control rule is an access control rule including 'CAN ID' 910 as shown in FIG. 9 in order to check an automotive Ethernet message, or when the access control rule is an access control rule for a CAN bus in order to check only a CAN ID, the average and standard deviation of the CAN ID transmission periods may be additionally taken into account.

Here, when it is determined based on variation in the average and the standard deviation that the CAN ID transmission period of the current control unit is delayed, a control unit other than the current control unit may be further searched for, whereby the target unit may be set.

For example, messages transmitted from 70~100 ECUs connected with a CAN bus may be simultaneously checked in all of the ECUs connected with the CAN bus. For CAN messages transmitted in this manner, the individual ECUs have their own transmission periods, and 95% of ECUs or more may transmit CAN messages according to individual periods, e.g., 10 ms, 12 ms, 20 ms, and the like. If CAN messages are simultaneously transmitted from multiple ECUs, a CAN message having a lower ID is preferentially transmitted, as determined through an arbitration process. That is, when a collision occurs during message transmission, a CAN message having priority is transmitted first, and the next message may be subsequently transmitted. Accordingly, transmission of a CAN message having a low priority may be delayed beyond the original transmission period. Also, the CAN message transmitted late in this transmission period may be transmitted earlier in the next period so as to compensate for the delay.

Figure 11:
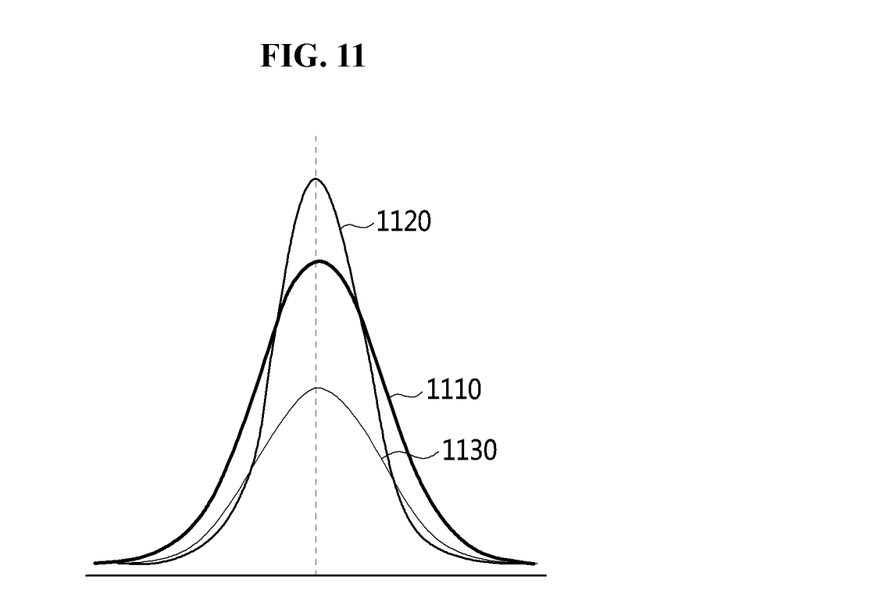
FIG. 11 is a view illustrating an example of variation in the standard deviation of CAN ID transmission periods according to the present invention.
Figure 12:
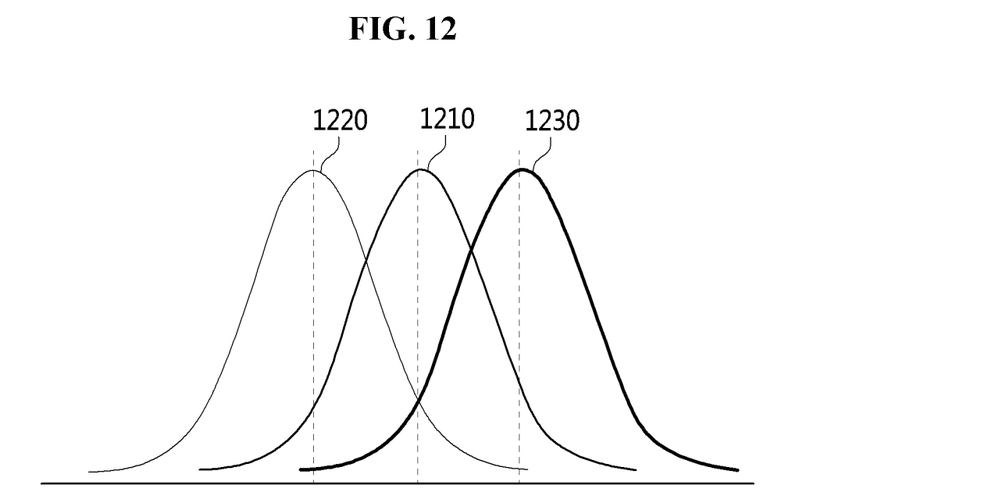
FIG. 12 is a view illustrating an example of variation in the average of CAN ID transmission periods according to the present invention.

When the standard deviation and the average of the CAN message transmission periods of these individual ECUs are calculated, graphs having the shapes illustrated in FIG. 11 and FIG. 12 may be generated. For example, assuming that a standard deviation graph and an average graph for the original transmission periods are the standard deviation graph 1110 illustrated in FIG. 11 and the average graph 1210 illustrated in FIG. 12, respectively, the graphs may be changed depending on a change in the processing load on the corresponding ECU, whereby the standard deviation graph 1120 or 1130 and the average graph 1220 or 1230 may be acquired.

For example, it may be assumed that an ECU #1 having an access control rule is present in the engine (721) group connected with the powertrain domain 720 via the CAN bus, as shown in FIG. 7, and that a new access control rule is intended to be stored in the ECU #1 in consideration of the CAN ID. Here, variation in the average and variation in the standard deviation of the transmission periods of a CAN ID transmitted from the ECU #1 are calculated, and when it is determined that the transmission period of the CAN ID is delayed with respect to the average and the standard deviation of the CAN ID transmission periods, a request to store the new access control rule in the ECU #2 or another ECU, rather than in the ECU #1, may be made.

Also, in the method for managing an access control list based on an automotive Ethernet according to an embodiment of the present invention, a storage request message, corresponding to the new access control rule, is transmitted to the target unit, whereby the new access control rule is stored at step S530.

For example, if the target unit is a powertrain domain, the powertrain domain may store the new access control rule in the access control list thereof after it receives the storage request message.

Figure 10:
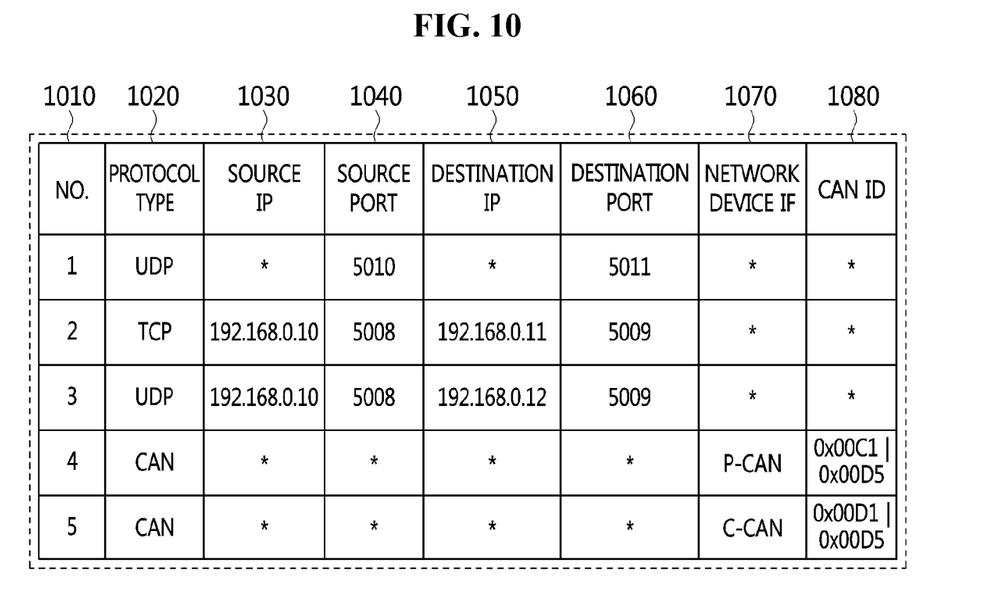
FIG. 10 is a view illustrating an example of an access control list according to the present invention.

For example, the access control list may be managed as shown in FIG. 10.

Referring to FIG. 10, the access control list 1000 according to an embodiment of the present invention may include an entry number (No) 1010, a protocol type 1020, a source IP address 1030, a source port number 1040, a destination IP address 1050, a destination port number 1060, a network device IF 1070, and a CAN ID 1080. Here, an access control rule, the protocol type 1020 of which is a CAN, may be separated from an Ethernet (TCP, UDP) rule, or may be managed together therewith in consideration of an environment in which a CAN and Ethernet are mixed.

Here, a storage confirmation message for checking whether storage of the new access control rule succeeds may be received from the target unit.

Here, when the new access control rule fails to be stored in the target unit, the storage confirmation message may include a result indicating storage failure and the cause of the failure.

Here, the storage confirmation message may not necessarily be transmitted.

Also, although not illustrated in FIG. 5, in the method for managing an access control list based on an automotive Ethernet according to an embodiment of the present invention, various kinds of information generated in the above-described process of managing the access control list may be stored in a separate storage module.

Using the above-described method for managing an access control list based on an automotive Ethernet, a large number of access control lists, greater than the limit on the number of access control lists previously capable of being stored, may be stored through domain control units including the gateway of an in-vehicle network or through the ECU of each domain.

Also, the access control lists are stored in multiple ECUs in a distributed manner, whereby the unnecessary consumption of processing time due to the presence of all access control lists in the central gateway may be reduced.

Figure 13:
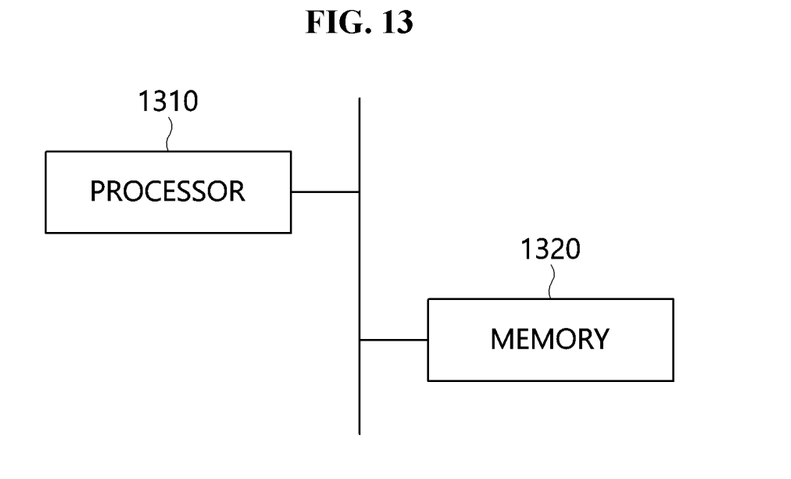
FIG. 13 is a block diagram illustrating an apparatus for managing an access control list based on an automotive Ethernet according to an embodiment of the present invention.

FIG. 13 is a block diagram illustrating an apparatus for managing an access control list based on an automotive Ethernet according to an embodiment of the present invention.

Referring to FIG. 13, the apparatus for managing an access control list based on an automotive Ethernet according to an embodiment of the present invention may include a processor 1310 and memory 1320.

The processor 1310 analyzes a new access control rule that is input to a vehicle in which the automotive Ethernet is applied.

Here, an in-vehicle network according to an embodiment of the present invention may be an Ethernet-based network, as shown in FIG. 6.

For example, an ADAS 640, which is increasingly applied in recently released vehicles, may receive information of an engine 621 or a transmission 622 in order to acquire vehicle driving information for cruise control service, and may also receive information related to camera control 631 in order to detect deviation from a lane.

These kinds of information may be received through messages transmitted from individual ECUs included in the engine (621) group and the transmission (622) group included in a powertrain domain 620. For example, the ECU #3 of the engine (621) group may generate a message, the destination of which is the ADAS 640, thereby transmitting information about engine RPM or speed information.

Also, camera information may be transmitted from the camera control (631) group of a multimedia domain 630 to the ADAS 640. For example, the Camera #1 ECU of the camera control (631) group may generate a message, the destination of which is the ADAS 640, and transmit the same to the ADAS 640.

Meanwhile, when the ADAS 640 determines that the vehicle deviates from a lane based on the determination of the driving situation, the ADAS 640 generates a message, the destination of which is the transmission 622, and transmits the same, thereby smoothly controlling the vehicle.

As described above, the message transmitted from each of the ECUs (including the ADAS) passes through the firewall of a gateway 610 and an access control module, and then only the allowed message is transmitted to the destination. Here, as the number of messages passing through the gateway 610 increases, the number of access control lists becomes more important. Also, because cost and stability are regarded as being more important in vehicles than in other systems, it is necessary to make the best use of resources of ECUs as well as a gateway.

Here, the gateway 610 has limited resources, and as the number of access control lists increases, the processing rate is further affected. Therefore, limiting the number of access control lists to be used in the access control module of the gateway may be an important issue with regard to ensuring stability. However, when the number of access control lists is limited and when registration of a new access control rule is not allowed even though more access control rules are required, the flow of necessary messages may be restricted, or it may be difficult to apply a more precise rule.

Therefore, in order to overcome these limitations, the present invention intends to propose a method for analyzing a new access control rule that is input through the port of the OBD-II 605, searching for a control unit other than the gateway 610 to manage the new access control rule, and storing the new access control rule in the control unit.

Here, the new access control rule may be input through the OBD-II 605, but may also be input through other networks and devices connected with the gateway 610.

Here, a network in which the automotive Ethernet and a control area network (CAN) are mixed may be applied to the vehicle.

For example, referring to FIG. 7, the internal network of the vehicle according to an embodiment of the present invention may correspond to a network environment in which a CAN and Ethernet are mixed. Here, when components in the powertrain domain 720 are connected via a CAN bus as shown in FIG. 7, a vehicle control message transmitted by the ADAS 740 is transmitted as an Ethernet message, but may be converted into a CAN message when it passes through the gateway 710 and the powertrain domain 720. That is, the message may be converted into a CAN message, and may then be transmitted to an ECU included in the engine 721 or the transmission 722.

Also, the processor 1310 searches for any one target unit to manage a new access control rule in consideration of at least one of a destination and an application target corresponding to the new access control rule.

Here, the target unit may be any one of the ECUs at the domain control unit level, which is equivalent in function to the gateway.

Here, a travel route for moving from the gateway of the vehicle to the destination corresponding to the new access control rule is looked for, and any one of multiple control units located on the travel route may be selected as the target unit.

For example, when the new access control rule is as shown in FIG. 8, the travel route may be looked for by referring to 'destination IP' corresponding to the destination 810. Then, a DCU (or an ECU equivalent in function thereto) located on the travel route may be selected as the target unit for storing and managing the new access control rule. Here, in order to quickly look for the travel route to the destination 810, the IP address system is required to be well organized with regard to respective levels of ECUs, and in connection therewith, the configuration of the in-vehicle network illustrated in FIG. 6 and FIG. 7 may be referred to.

If the destination IP address is 192.168.10.30, as shown in FIG. 8, the new access control rule may be transmitted to the DCU corresponding to 192.168.X.X, in which case the actual address of the DCU may be set to match the IP address system (e.g., 192.168.1.10).

Here, the target unit is selected by prioritizing a control unit at an upper level, among the multiple control units. However, when at least one of the memory usage, the average CPU usage, and the network load of the control unit at the upper level is equal to or greater than a preset threshold, a control unit at the level immediately beneath the upper level may be selected as the target unit.

Generally, when the network environment of a vehicle is constructed, the amount of network traffic for transmission/reception messages is calculated in advance along with the CPU usage and the memory usage, and the size of an access control list capable of being managed by each of the ECUs (including a domain gateway) may be identified based on the calculated values. However, the load on each ECU may be changed due to messages and access control rules that are newly added during long-term system use, or due to various external factors, such as deterioration of the device.

Accordingly, in the present invention, the target unit to store and manage a new access control rule may be selected in consideration of the CPU usage, memory usage, and network load of each of the multiple control units. For example, even though unoccupied (available) entries are present in the access control list in an ECU in which a new access control rule is to be stored, if the average CPU usage of the corresponding ECU is equal to or greater than a specific threshold, the new access control rule may be stored in an ECU at the level beneath that of the corresponding ECU.

Here, when the application target corresponding to the new access control rule includes a control area network (CAN) ID, the target unit may be selected in consideration of the average and the standard deviation of CAN ID transmission periods, corresponding to at least one control unit connected through a CAN bus, among the multiple control units.

That is, the target unit may be primarily selected by searching for the target unit based on 'destination IP' of the new access control rule. When the access control rule is an access control rule including 'CAN ID' 910 as shown in FIG. 9 in order to check an automotive Ethernet message, or when the access control rule is an access control rule for a CAN bus in order to check only a CAN ID, the average and the standard deviation of the CAN ID transmission periods may be additionally taken into account.

Here, when it is determined based on variation in the average and the standard deviation that the CAN ID transmission period of the current control unit is delayed, a control unit other than the current control unit may be further searched for, whereby the target unit may be set.

For example, messages transmitted from 70~100 ECUs connected with a CAN bus may be simultaneously checked in all of the ECUs connected with the CAN bus. For CAN messages transmitted in this manner, the individual ECUs have their own transmission periods, and 95% or more of ECUs may transmit CAN messages according to individual periods, e.g., 10 ms, 12 ms, 20 ms, and the like. If CAN messages are simultaneously transmitted from multiple ECUs, a CAN message having a lower ID is preferentially transmitted, as determined through an arbitration process. That is, when a collision occurs during message transmission, a CAN message having priority is transmitted first, and the next message may be subsequently transmitted. Accordingly, transmission of a CAN message having a low priority may be delayed beyond the original transmission period. Also, the CAN message transmitted late in this transmission period may be transmitted earlier in the next period so as to compensate for the delay.

When the standard deviation and the average of the CAN message transmission periods of these individual ECUs are calculated, graphs having the shapes illustrated in FIG. 11 and FIG. 12 may be generated. For example, assuming that a standard deviation graph and an average graph for the original transmission periods are the standard deviation graph 1110 illustrated in FIG. 11 and the average graph 1210 illustrated in FIG. 12, respectively, the graphs may be changed depending on variation in the processing load on the corresponding ECU, whereby the standard deviation graph 1120 or 1130 and the average graph 1220 or 1230 may be acquired.

For example, it may be assumed that an ECU #1 having an access control rule is present in the engine (721) group connected with the powertrain domain 720 via the CAN bus, as shown in FIG. 7, and that a new access control rule is intended to be stored in the ECU #1 in consideration of the CAN ID. Here, variation in the average and variation in the standard deviation of the transmission periods of a CAN ID transmitted from the ECU #1 are calculated, and when it is determined that the transmission period of the CAN ID is delayed with respect to the average and the standard deviation of the CAN ID transmission periods, a request to store the new access control rule in the ECU #2 or another ECU, rather than in the ECU #1, may be made.

Also, the processor 1310 transmits a storage request message, corresponding to the new access control rule, to the target unit, thereby storing the new access control rule.

For example, if the target unit is a powertrain domain, the powertrain domain may store the new access control rule in the access control list thereof after it receives the storage request message.

For example, the access control list may be managed as shown in FIG. 10.

Referring to FIG. 10, the access control list 1000 according to an embodiment of the present invention may include an entry number (No) 1010, a protocol type 1020, a source IP address 1030, a source port number 1040, a destination IP address 1050, a destination port number 1060, a network device IF 1070, and a CAN ID 1080. Here, an access control rule, the protocol type 1020 of which is a CAN, may be separated from an Ethernet (TCP, UDP) rule, or may be managed together therewith in consideration of an environment in which a CAN and Ethernet are mixed.

Here, a storage confirmation message for checking whether storage of the new access control rule succeeds may be received from the target unit.

Here, when the new access control rule fails to be stored in the target unit, the storage confirmation message may include a result indicating storage failure and the cause of the failure.

Here, the storage confirmation message may not necessarily be transmitted.

The memory 1320 may store various kinds of information generated in the above-described process of managing an access control list.

Through the above-described apparatus for managing an access control list based on an automotive Ethernet, a large number of access control lists, greater than the limit on the number of access control lists previously capable of being stored, may be stored through domain control units including the gateway of an in-vehicle network or through the ECU of each domain.

Also, the access control lists are stored in multiple ECUs in a distributed manner, whereby the unnecessary consumption of processing time due to the presence of all access control lists in the central gateway may be reduced.

Meanwhile, the method of the present invention described above may be implemented in a computer program. The code and code segments of the program may be readily inferred by computer programmers having ordinary skill in the art to which the present invention pertains. Also, the program is stored in a computer-readable recording medium (information storage medium) and read and executed by a computer, thereby implementing the method of the present invention. Also, the recording medium includes all types of computer-readable recording media.

According to the present invention, technology for efficiently managing an access control list for protecting an in-vehicle network may be provided.

Also, the present invention limits the number of access control lists to be managed by a vehicle gateway and stores newly added access control policies in a distributed manner, whereby a situation in which an attack message is not filtered out because a new access control policy is not added may be prevented.

Also, the present invention may perform lightweight security for an in-vehicle network by using idle resources of an ECU in a vehicle to the greatest extent possible.

As described above, the method for managing an access control list based on an automotive Ethernet and the apparatus for the same according to the present invention are not limitedly applied to the configurations and operations of the above-described embodiments, but all or some of the embodiments may be selectively combined and configured, so the embodiments may be modified in various ways.

What is claimed is:

1. A method for managing an access control list based on an automotive Ethernet, comprising:
    analyzing a new access control rule input to a vehicle in which the automotive Ethernet is applied;
    searching for any one target unit to manage the new access control rule in consideration of at least one of a destination and an application target corresponding to the new access control rule; and
    storing the new access control rule by transmitting a storage request message corresponding to the new access control rule to the target unit,
    wherein searching for the target unit is configured to look for a travel route for moving from a gateway of the vehicle to the destination corresponding to the new access control rule.

2. The method of claim 1, wherein searching for the target unit is further configured to select any one of multiple control units located on the travel route as the target unit.

3. The method of claim 2, wherein searching for the target unit is configured to select the target unit by giving priority to a control unit at an upper level, among the multiple control units, and when at least one of a memory usage, an average CPU usage and a network load of the control unit at the upper level is equal to or greater than a preset threshold, to select a control unit at a level immediately beneath the upper level as the target unit.

4. The method of claim 2, wherein searching for the target unit is configured to select the target unit in consideration of an average and a standard deviation of Control Area Network (CAN) ID transmission periods corresponding to at least one control unit connected to a CAN bus, among the multiple control units, when a CAN ID is included in the application target corresponding to the new access control rule.

5. The method of claim 4, wherein searching for the target unit is configured to select the target unit by further searching for a control unit other than a current control unit when it is determined based on variation in the average and the standard deviation that a CAN ID transmission period of the current control unit is delayed.

6. The method of claim 4, wherein a network in which the automotive Ethernet and a Control Area Network (CAN) are mixed is applied to the vehicle.

7. The method of claim 1, wherein storing the new access control rule comprises:
    receiving, from the target unit, a storage confirmation message for checking whether storage of the new access control rule succeeds.

8. The method of claim 7, wherein, when the new access control rule fails to be stored in the target unit, the storage confirmation message includes a result indicating storage failure and a cause of failure.

9. An apparatus for managing an access control list based on an automotive Ethernet, comprising:
    a communication unit for receiving a new access control rule; and
    a processor for analyzing the new access control rule that is input to a vehicle in which the automotive Ethernet is applied, searching for any one target unit to manage the new access control rule in consideration of at least one of a destination and an application target corresponding to the new access control rule, and storing the new access control rule by transmitting a storage request message corresponding to the new access control rule to the target unit,
    wherein the processor looks for a travel route for moving from a gateway of the vehicle to the destination corresponding to the new access control rule.

10. The apparatus of claim 9, wherein the processor selects any one of multiple control units located on the travel route as the target unit.

11. The apparatus of claim 10, wherein the processor selects the target unit by giving priority to a control unit at an upper level, among the multiple control units, and when at least one of a memory usage, an average CPU usage and a network load of the control unit at the upper level is equal to or greater than a preset threshold, the processor selects a control unit at a level immediately beneath the upper level as the target unit.

12. The apparatus of claim 10, wherein the processor selects the target unit in consideration of an average and a standard deviation of Control Area Network (CAN) ID transmission periods corresponding to at least one control unit connected to a CAN bus, among the multiple control units, when a CAN ID is included in the application target corresponding to the new access control rule.

13. The apparatus of claim 12, wherein, when it is determined based on variation in the average and the standard deviation that a CAN ID transmission period of a current control unit is delayed, the processor further searches for a control unit other than the current control unit, thereby selecting the target unit.

14. The apparatus of claim 12, wherein a network in which the automotive Ethernet and a Control Area Network (CAN) are mixed is applied to the vehicle.

15. The apparatus of claim 9, wherein the processor receives, from the target unit, a storage confirmation message for checking whether storage of the new access control rule succeeds.

16. The apparatus of claim 15, wherein, when the new access control rule fails to be stored in the target unit, the storage confirmation message includes a result indicating storage failure and a cause of failure.

\* \* \* \* \*